United States Patent [19]
Graml

[11] 3,974,005
[45] Aug. 10, 1976

[54] INFLATION SEALING DEVICE FOR TUBELESS TIRES FOR MOTOR VEHICLES

[76] Inventor: Josef Graml, Albert-Schweitzer-Str. 50, 8398 Pocking, Germany

[22] Filed: May 27, 1975

[21] Appl. No.: 580,944

[30] Foreign Application Priority Data
Oct. 3, 1974   Austria .............................. 7976/74

[52] U.S. Cl. ................................................ 157/1.1
[51] Int. Cl.² ........................................ B60C 25/00
[58] Field of Search ........................... 157/1.1, 1.17

[56] References Cited
UNITED STATES PATENTS
2,779,397   1/1957   Kohsiek ............................. 157/1.1
3,366,153   1/1968   Allen ................................. 157/1.1

*Primary Examiner*—Al Lawrence Smith
*Assistant Examiner*—James G. Smith
*Attorney, Agent, or Firm*—Stevens, Davis, Miller & Mosher

[57] ABSTRACT

An apparatus is provided for forming a seal between a tubeless pneumatic tire and a motor vehicle rim while the tire is being inflated. The device has a split ring shaped member with overlapping edges, a rubber liner and a means for clamping the overlapping edges together while the device is disposed with the rubber liner pressing against the sidewall of the tire and on the lips of the rim to form a fluid tight seal until the tire sidewall has moved into engagement with the rim under inflation pressure.

5 Claims, 3 Drawing Figures

INFLATION SEALING DEVICE FOR TUBELESS TIRES FOR MOTOR VEHICLES

The present invention relates to a device for sealing tubeless tires when inflating them on a wheel rim.

Tubeless tires are becoming more and more popular for motor vehicles, not only for passenger cars, but also for trucks. Special problems arise upon the filling or inflating of such tires on their rim and therefore after the tire has been placed on the rim. In this connection it must be borne in mind that the tires are deformed, for instance as a result of lengthy storage in piles, but for the filling or inflation it is necessary that they in each case rest tightly against their rim so that no air can escape and so that inflation or filling is possible.

Means are already known by which tubeless tires are sealed off when they are inflated on their rim. In this case one sidewall of the tire is pressed against the rim while the device is intended to seal between the other sidewall of the tire and the rim. These devices are not only complicated in construction and relatively expensive, but in addition do not always fulfill their purpose in reliable fashion.

An object of the present invention is to provide a device of the aforementioned type which is both simple in construction and operation and cheap and also assures a dependable seal between the tire and rim even if the tubeless tire in question is extensively deformed.

Figure 1:
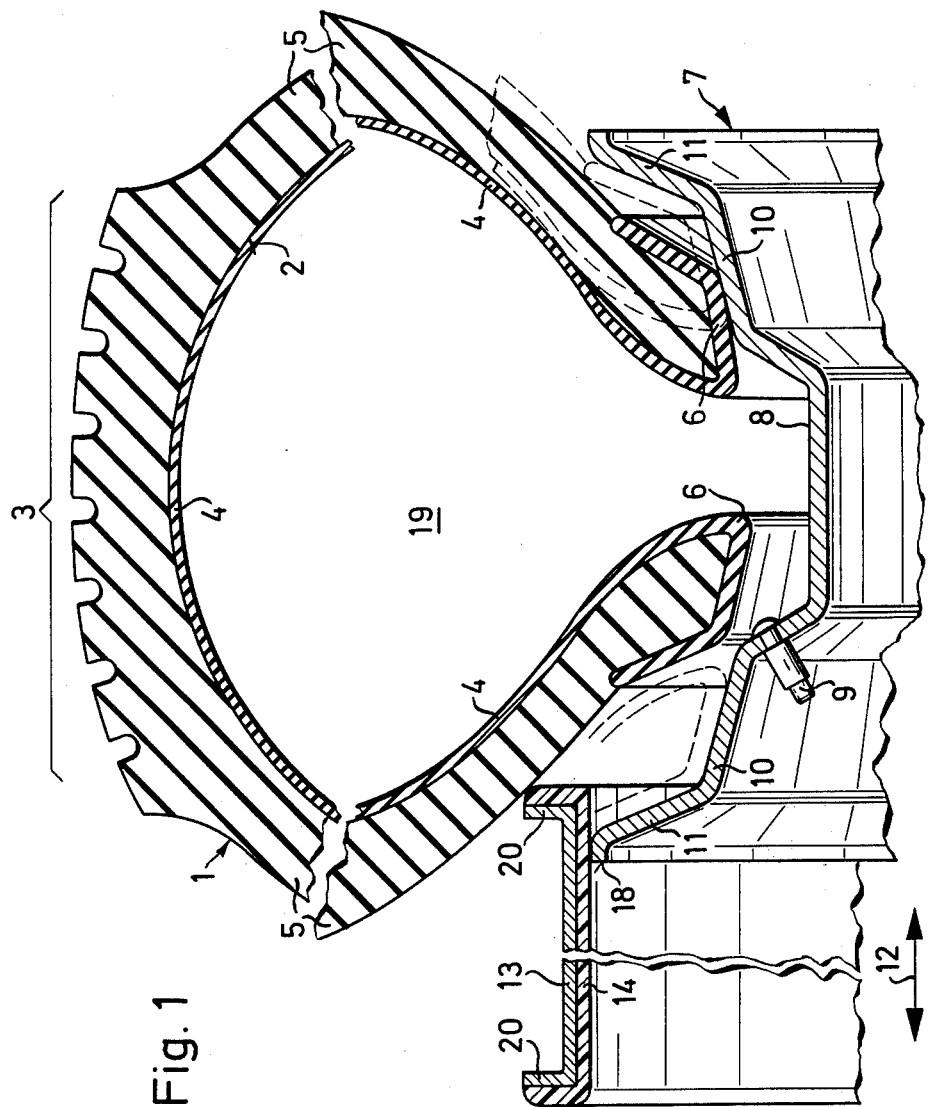
Figure 2:
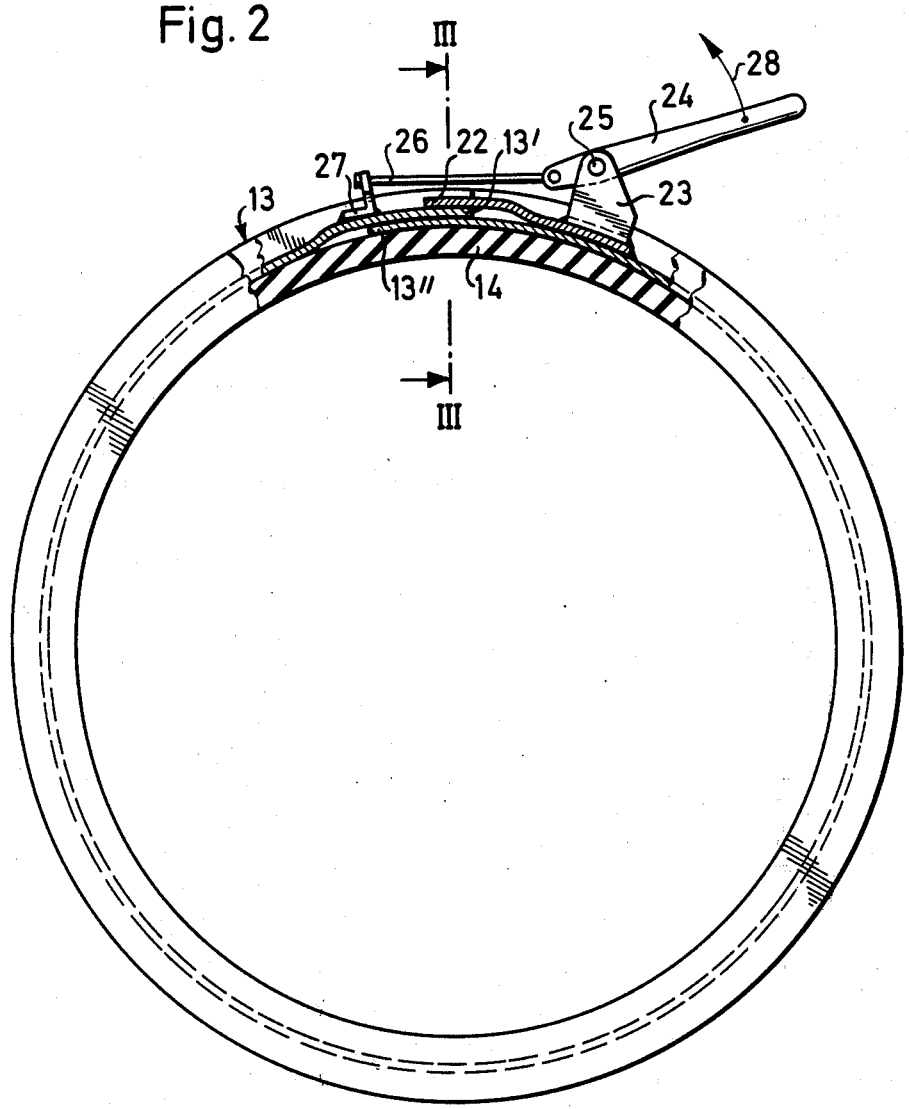
Figure 3:
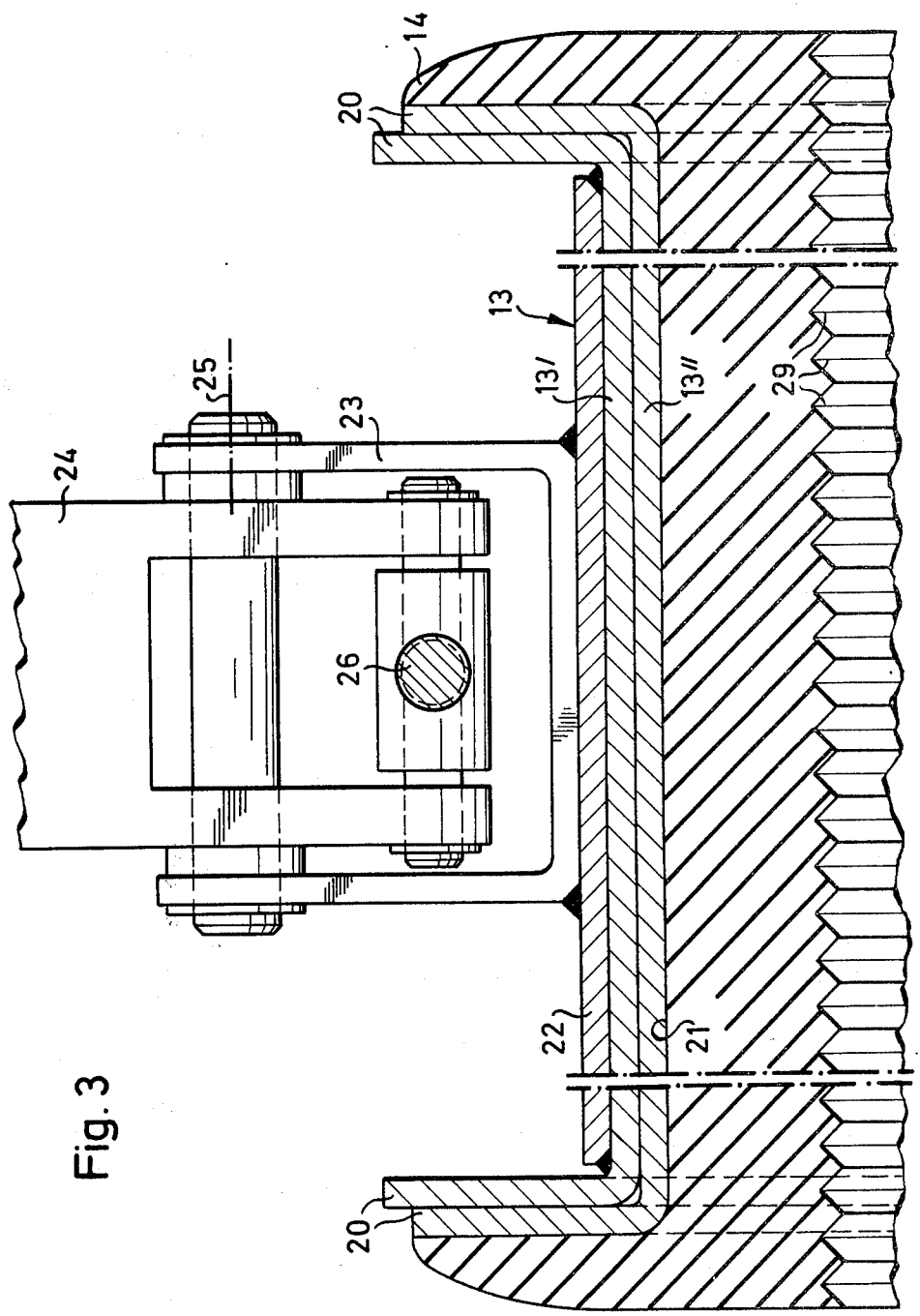

Other objects will become apparent from the following description with reference to the accompanying drawing wherein FIG. 1 shows diagrammatically a section through a rim with tubeless tire thereon during the inflation or filling by means of a device in accordance with the invention;

FIG. 2 is a side view, partially in section, of the invention device of FIG. 1, on a smaller scale; and FIG. 3 is a section along the line III—III of FIG. 2, on a larger scale.

The device provided by the invention is characterized by a cylindrical ring which is adapted to be pushed onto the rim so that its face rests against the adjacent sidewall of the tire, the ring having a flexible inner lining which is pressed elastically against the adjacent lip of the rim. The ring is interrupted at one point and the two ends of the ring are adapted to be clamped together. The inner lining is a closed ring of elastic material and is inserted loosely in the clampable ring.

The ring is preferably of U-shaped cross-section with two outer vertical circumferential side flanges while the annular inner lining is provided with an outer annular groove in which the ring is received.

The annular inner lining is advantageously provided with circumferential inner riffling or alternate rings and grooves. In this way a dependable seal is definitely assured even in case of extensively damaged rim lips.

The ring may be metal or plastic while the annular inner lining may be made of natural or synthetic rubber or other plastic. If the ring has a U-shaped cross-section and two outer vertical circumferential side flanges, it may be stamped or rolled from a metal plate or extruded, cast, or blown from plastic.

One embodiment of the device of the invention is described below by way of example with reference to the drawing.

Referring to FIG. 1, the tubeless tire 1 has an airtight layer of rubber 4 lining the inside of the crown 2 which bears the profiled tread 3 and the sidewalls 5 which pass in each case into an inner circumferential bead 6.

The rim 7, which is also airtight and should be free of rust, bumps and other unevenesses, is provided with a central circumferential depression 8 into which there extends a valve 9 and adjoining which there are two lateral sloping bottom sections 10, each of which passes into a sidewall 11.

The inflating device provided by the invention comprises a ring 13 which is displaceable on the rim 7 in the direction shown by the double-ended arrow 12 (FIG. 1) and has a flexible inner lining 14.

After the tubeless tire 1 has been placed on the rim 7 the inner lining 14 of the ring 13 is placed over the rim 7 and the ring is clamped together so that the inner lining 14 of the ring 13 rests tightly at its front against the adjacent sidewall 5 of the tire 1 and is also pressed tightly against the adjacent rim lip 18. On the side away from the ring 13, the tire 1 rests by means of the bead 6 tightly against the corresponding bottom section 10. If compressed air is now introduced through the valve 9 of the tire 1, i.e. if the tire is inflated, no air can escape from the inside chamber 19 even if the tire 1 is relatively largely deformed. Upon inflation, the beads 6 of the tire 1 are pressed against the bottom sections 10 and the sidewalls 11 so that the position shown in dashed line in FIG. 1 is obtained. In this connection the ring 13 with the inner lining 14 is pushed to the left as seen in FIG. 1.

Rim 7 and ring 13 are held by supports, not shown, and guided for movement with respect to each other in the manner described. The supports can advantageously be provided on an ordinary wheel changing device.

The ring 13 may be metal or plastic and in the former case may be produced for instance by stamping or rolling and in the latter case by casting, extruding, or blowing. The inner lining 14 may be natural or synthetic rubber or some other suitable plastic.

As is readily apparent from FIGS. 2 and 3, the ring 13 is interrupted at one place and the inner lining 14 is developed as a closed ring of elastic material and inserted loosely in the clampable ring 13. The ring 13 has a U-shaped cross-section, i.e. in smooth cylindrical manner with two outer vertical circumferential side flanges 20. The annular inner lining 14 has an outer annular groove 21 in which the ring 13 is received.

At the point of interruption of the ring 13 one ring end 13' engages between the other ring end 13" and a tongue 22 fastened to the latter. The two ring ends 13' and 13" can be clamped together. For this purpose a lever 24 is supported for swinging about a pin 25 in a U-shaped bracket 23 on the ring 13" or the tongue 22, the inner end of the lever being pivoted to a draw bar 26. The latter acts on an angle piece 27 of the ring end 13'.

In FIG. 2 the device is shown in open condition, in which condition it is brought onto a rim 7. The lever 24 is then swung in the direction indicated by the arrow 28 so that the two ring ends 13' and 13" move towards each other and the inner lining 14 is pressed elastically against the adjacent rim lip 18, which is not shown in FIGS. 2 and 3.

As can be noted from FIG. 3, the inner lining 14 can be provided with circumferential inner grooves and ridges forming corrugations 29. This assures a dependable seal even if the rim lip 18 is severely damaged.

Although the invention is described in detail for the purpose of illustration it is to be understood that such detail is solely for that purpose and that variations can be made therein by those skilled in the art without departing from the spirit and scope of the invention except as it may be limited by the claims.

What is claimed is:

1. An apparatus for sealing a tubeless tire on a rim while the tire is being inflated, said rim having an annular lip, said apparatus comprising a ring shaped member split transversely at one point to provide overlapping ends, an annular flexible member loosely disposed within said ring shaped member, said ring shaped member and flexible member being adapted to be disposed about the rim with the flexible member disposed against the lip of the rim and against a sidewall of the tire, and means for clamping said ends together and press the flexible member into fluid tight engagement with the said lip and said sidewall.

2. The apparatus of claim 1 wherein the ring has a U-shaped cross-section with two outer vertical circumferential side flanges and the annular inner lining is provided with an outer annular groove in which the ring is received.

3. The apparatus of claim 1 wherein the annular inner lining is provided with circumferential inner grooves and ridges.

4. The apparatus of claim 1 wherein the ring is metal or plastic and the annular inner lining is rubber.

5. A device for sealing a tubeless tire and rim assembly against loss of air under pressure while the tire is being inflated on the rim, said rim having a cross-sectional configuration which provides an annular channel in which beaded edges of the tire are held in a fluid tight fit when the tire is inflated, said rim terminating in annular lips which extend axially outwardly from the channel, said device comprising a ring shaped member split at one point and having overlapping edges, an uninterrupted flexible lining member loosely fitting in the ring, said ring member and lining member having an annular flat surface and a flange at each edge which extends radially outwardly therefrom, said ring and liner being adapted to be disposed about a rim with the lining member on the bead and disposed against one side of the tire when the opposite side of the tire is pressed against the rim, and means for clamping the overlapping edges of the ring together on the said lips with the lining member forming a fluid tight seal against the tire sidewall and lip until the tire is inflated and its beaded edges form a fluid tight seal with the rim.

* * * * *